J. A. MOORE.
Corn-Coverers.

No. 144,918.  Patented Nov. 25, 1873.

Witnesses:  Inventor:

UNITED STATES PATENT OFFICE.

JOEL A. MOORE, OF SALEM, NEW JERSEY.

IMPROVEMENT IN CORN-COVERERS.

Specification forming part of Letters Patent No. 144,918, dated November 25, 1873; application filed August 4, 1873.

*To all whom it may concern:*

Figure 1:
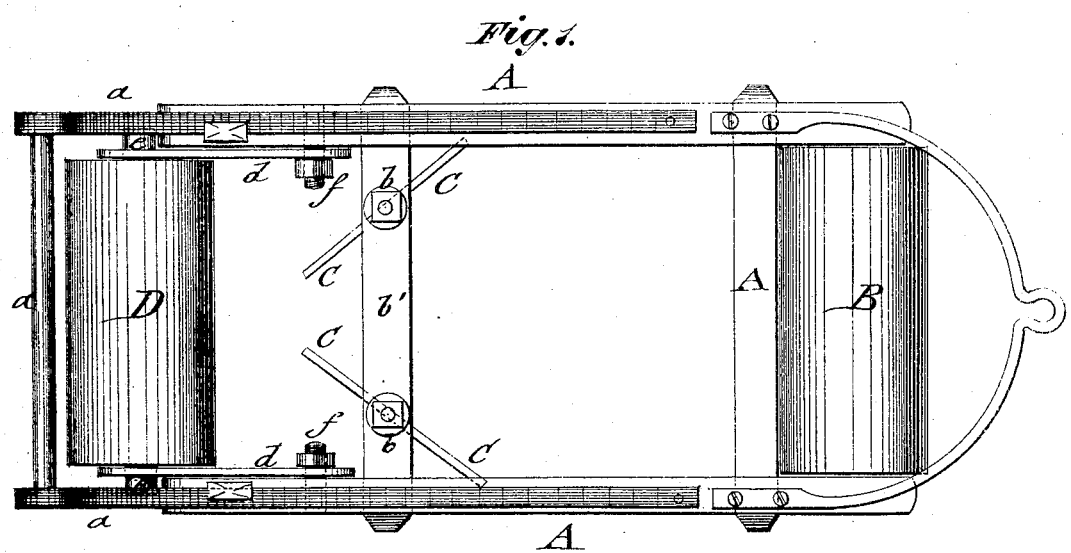
Figure 2:
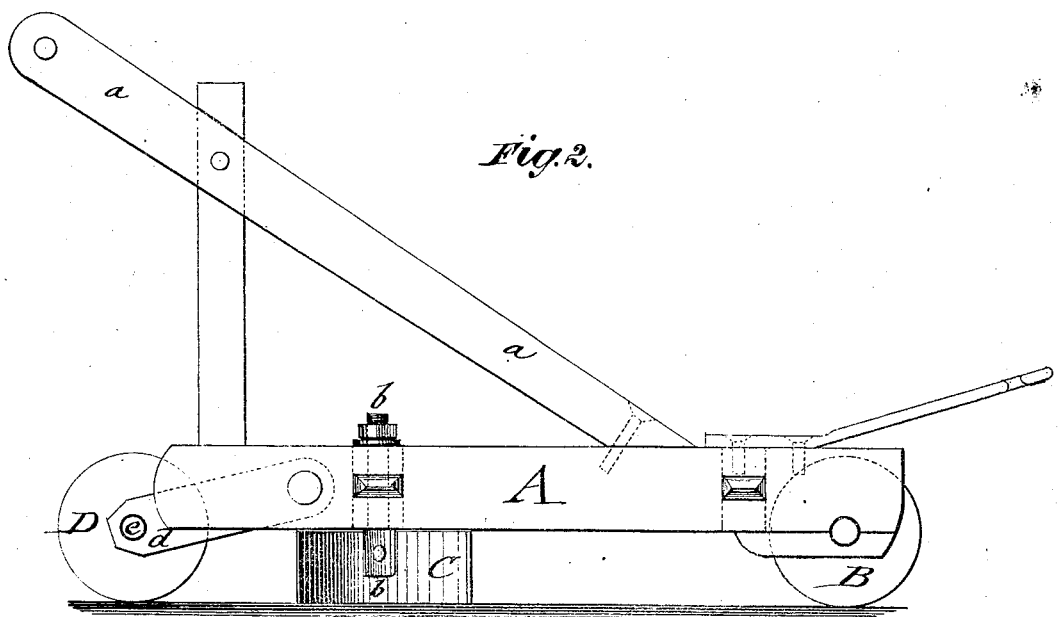

Be it known that I, JOEL A. MOORE, of Salem, in the county of Salem and State of New Jersey, have invented a new and Improved Corn-Coverer, of which the following is a specification:

In the accompanying drawing, Figure 1 represents a top view of my improved corn-coverer, and Fig. 2 a side elevation of the same.

Similar letters of reference indicate corresponding parts.

The invention will first be fully described, and then clearly pointed out in the claim.

In the drawing, A represents the frame of the coverer, to the front part of which the horse is attached. Suitable handles $a$ are applied at the rear part, to guide the coverer and control the thickness of the layer of earth to be placed over the seed. The front roller, B, is placed laterally in bearings of the front part of frame A, and serves to loosen the earth and crush the clods. The hoes or plates C are rigidly applied, by vertical rods $b$, to a lateral piece, $b'$, of frame A, and made of oblong shape, and placed under suitable angle toward the longitudinal axis of the coverer, by means of which the earth is thrown over the corn to cover the same, forming, also, a ridge or elevation, which is then spread out level by the hind roller, D. The hind roller, D, is supported loosely by arms or rods $d$, which are connected to the projecting ends of its shaft $e$, and pivoted at $f$ to the rear part of frame A. The quantity of earth to be thrown by the hoes C over the seed may thereby be regulated as the soil or circumstances require it, the roller D yielding freely to the pressure exerted on the handles.

Having thus described my invention, I claim as new, and desire to secure by Letters Patent—

The combination described, with the ordinary ridges C and leveler D, of a front clod-crusher, B, that pulverizes the clods before they are raked up into the ridge intended to receive the seed.

JOEL A. MOORE.

Witnesses:
JOSEPH D. HILES,
RICHARD EARNEST.